US012656865B2

(12) United States Patent
Yang et al.

(10) Patent No.: US 12,656,865 B2
(45) Date of Patent: Jun. 16, 2026

(54) ELECTRONIC DEVICE WHICH MINIMIZES DIFFERENCE BETWEEN REAL SPACE AND VIRTUAL SPACE AND METHOD FOR MANUFACTURING SAME

(71) Applicant: Samsung Electronics Co., Ltd., Suwon-si (KR)

(72) Inventors: Sungkwang Yang, Suwon-si (KR); Jonggyu Park, Suwon-si (KR); Jinchoul Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/042,705

(22) Filed: Jan. 31, 2025

(65) Prior Publication Data

US 2025/0181156 A1 Jun. 5, 2025

Related U.S. Application Data

(63) Continuation of application No. PCT/KR2023/013560, filed on Sep. 11, 2023.

(30) Foreign Application Priority Data

Sep. 15, 2022 (KR) ........................ 10-2022-0116471
Oct. 4, 2022 (KR) ........................ 10-2022-0126019

(51) Int. Cl.
*G06F 3/01* (2006.01)
*G06F 1/16* (2006.01)

(52) U.S. Cl.
CPC .............. *G06F 3/013* (2013.01); *G06F 1/163* (2013.01)

(58) Field of Classification Search
None
See application file for complete search history.

(56) References Cited

U.S. PATENT DOCUMENTS

| | | | | |
|---|---|---|---|---|
| 9,552,060 | B2 | 1/2017 | Ambrus et al. | |
| 9,558,719 | B2 * | 1/2017 | Matsushima | .......... G09G 5/377 |
| 9,874,755 | B2 * | 1/2018 | Tempel | .............. G02B 27/0176 |
| 10,725,305 | B2 * | 7/2020 | Tempel | .............. G02B 27/0176 |
| 2006/0072206 | A1 | 4/2006 | Tsuyuki et al. | |
| 2017/0102546 | A1 * | 4/2017 | Tempel | .............. G02B 27/0176 |

(Continued)

FOREIGN PATENT DOCUMENTS

| | | |
|---|---|---|
| KR | 10-2019-0021894 A | 3/2019 |
| KR | 10-2019-0106947 A | 9/2019 |

(Continued)

OTHER PUBLICATIONS

International Search Report and written opinion dated Dec. 12, 2023, issued in International Application No. PCT/KR2023/013560.

(Continued)

*Primary Examiner* — Krishna P Neupane
(74) *Attorney, Agent, or Firm* — Jefferson IP Law, LLP

(57) ABSTRACT

A wearable electronic device is provided. The electronic device includes a lens assembly including a first lens, and a camera module including a second lens having same optical axis as an optical axis of the first lens and coupled to the lens assembly, wherein the lens assembly and the camera module are configured to move together while the optical axis of the first lens and the optical axis of the second lens are aligned.

18 Claims, 7 Drawing Sheets

(56) References Cited

U.S. PATENT DOCUMENTS

2017/0337737 A1 * 11/2017 Edwards ............... F16M 13/04
2021/0343033 A1    11/2021 Bhat et al.

FOREIGN PATENT DOCUMENTS

| KR | 10-2020/0108666 | A | 9/2020 |
| KR | 10-2022-0013384 | A | 2/2022 |
| KR | 10-2022-0068198 | A | 5/2022 |
| KR | 10-2022-0089023 | A | 6/2022 |
| KR | 10-2022-0091160 | A | 6/2022 |
| KR | 10-2417177 | B1 | 7/2022 |
| WO | 20181/58347 | A1 | 9/2018 |
| WO | 2021/022028 | A1 | 2/2021 |
| WO | 2022/135284 | A1 | 6/2022 |

OTHER PUBLICATIONS

Brown et al., "Electronic see-through head mounted display with minimal peripheral obscuration", Optical Architectures for Displays and Sensing in Augmented, Virtual, and Mixed Reality (AR, VR, MR), Feb. 19, 2020.
Steed et al., "The AR-Rift 2 Prototype", 2017 IEEE Virtual Reality (VR), Mar. 18-22, 2017.
European Search Report dated Sep. 11, 2025, issued in European Application No. 23865804.1.

* cited by examiner

ELECTRONIC DEVICE WHICH MINIMIZES DIFFERENCE BETWEEN REAL SPACE AND VIRTUAL SPACE AND METHOD FOR MANUFACTURING SAME

CROSS-REFERENCE TO RELATED APPLICATION(S)

This application is a continuation application, claiming priority under 35 U.S.C. § 365 (c), of an International application No. PCT/KR2023/013560, filed on Sep. 11, 2023, which is based on and claims the benefit of a Korean patent application number 10-2022-0116471, filed on Sep. 15, 2022, in the Korean Intellectual Property Office, and of a Korean patent application number 10-2022-0126019, filed on Oct. 4, 2022, in the Korean Intellectual Property Office, the disclosure of each of which is incorporated by reference herein in its entirety.

BACKGROUND

1. Field

The disclosure relates to an electronic device for minimizing a difference between a real space and a virtual space and a method for manufacturing the same.

2. Description of Related Art

Electronic devices including user interfaces that provide virtual reality (VR), augmented reality (AR), mixed reality (MR) and/or extended reality (XR) experiences are being developed.

The above description is information the inventor(s) acquired during the course of conceiving the disclosure, or already possessed at the time, and is not necessarily art publicly known before the disclosure was filed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device for minimizing a difference between a real space and a virtual space and a method for manufacturing the same.

Additional aspects will be set forth in part in the description which follows and, in part, will be apparent from the description, or may be learned by practice of the presented embodiments.

In accordance with an aspect of the disclosure, a wearable electronic device is provided. The wearable electronic device includes a lens assembly including a first lens, a camera module including a second lens having same optical axis as an optical axis of the first lens, and coupled with the lens assembly, wherein the lens assembly and the camera module are configured to move together while the optical axis of the first lens and the optical axis of the second lens are aligned.

In accordance with another aspect of the disclosure, a method of manufacturing a wearable electronic device is provided. The method includes securing a display module to a lens assembly including a first lens, wherein the display module is configured to output an image ray toward the lens assembly, and coupling a camera module including a second lens having same optical axis as an optical axis of the first lens with the lens assembly, wherein the lens assembly and the camera module are configured to move together while an optical axis of the first lens and an optical axis of the second lens are aligned.

In accordance with another aspect of the disclosure, a wearable electronic device is provided. The wearable electronic device includes a lens assembly including a first lens, a camera module including a second lens having same optical axis as an optical axis of the first lens and coupled with the lens assembly, memory storing one or more computer programs, a display module disposed between the lens assembly and the camera module, and configured to output an image ray toward the lens assembly, one or more processors configured to build a virtual space and communicatively coupled to the lens assembly, the camera module, the memory, and the display module, wherein the one or more computer programs include computer-executable instructions that, when executed by the one or more processors individually or collectively, cause the wearable electronic device to determine whether a pupil of a user and the optical axis of the first lens are aligned, in response to determining that the pupil of the user is not aligned with the optical axis of the first lens, shift a second type of image related to a virtual space generated by the processor based on a first type of image related to a real space obtained from the camera module, and output the first type of image and the shifted second type of image to the display module.

In accordance with another aspect of the disclosure, a method implemented by a processor is provided. The method includes determining whether a pupil of a user and an optical axis of a first lens included in a lens assembly are aligned, in response to determining that the pupil of the user is not aligned with the optical axis of the first lens, shifting a second type of image related to a virtual space generated by the processor based on a first type of image related to a real space obtained from a camera module including a second lens having the same optical axis as the optical axis of the first lens, and outputting the first type of image and the shifted second type of image to a display module, wherein the camera module is coupled with the lens assembly, and wherein the display module is disposed between the lens assembly and the camera module, and configured to output an image ray toward the lens assembly.

In accordance with another aspect of the disclosure, one or more non-transitory computer-readable storage media storing one or more computer programs including computer-executable instructions that, when executed by one or more processors of a wearable electronic device individually or collectively, cause the wearable electronic device to perform operations are provided. The operations include determining whether a pupil of a user and an optical axis of a first lens comprised in a lens assembly are aligned, in response to determining that the pupil of the user is not aligned with the optical axis of the first lens, shifting a second type of image related to a virtual space generated by the processor based on a first type of image related to a real space obtained from a camera module 430 a second lens having the same optical axis as the optical axis of the first lens, and outputting the first type of image and the shifted second type of image to a display module, wherein, the camera module is coupled with the lens assembly, and wherein the display module is disposed between the lens assembly and the camera module, and configured to output an image ray toward the lens assembly.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
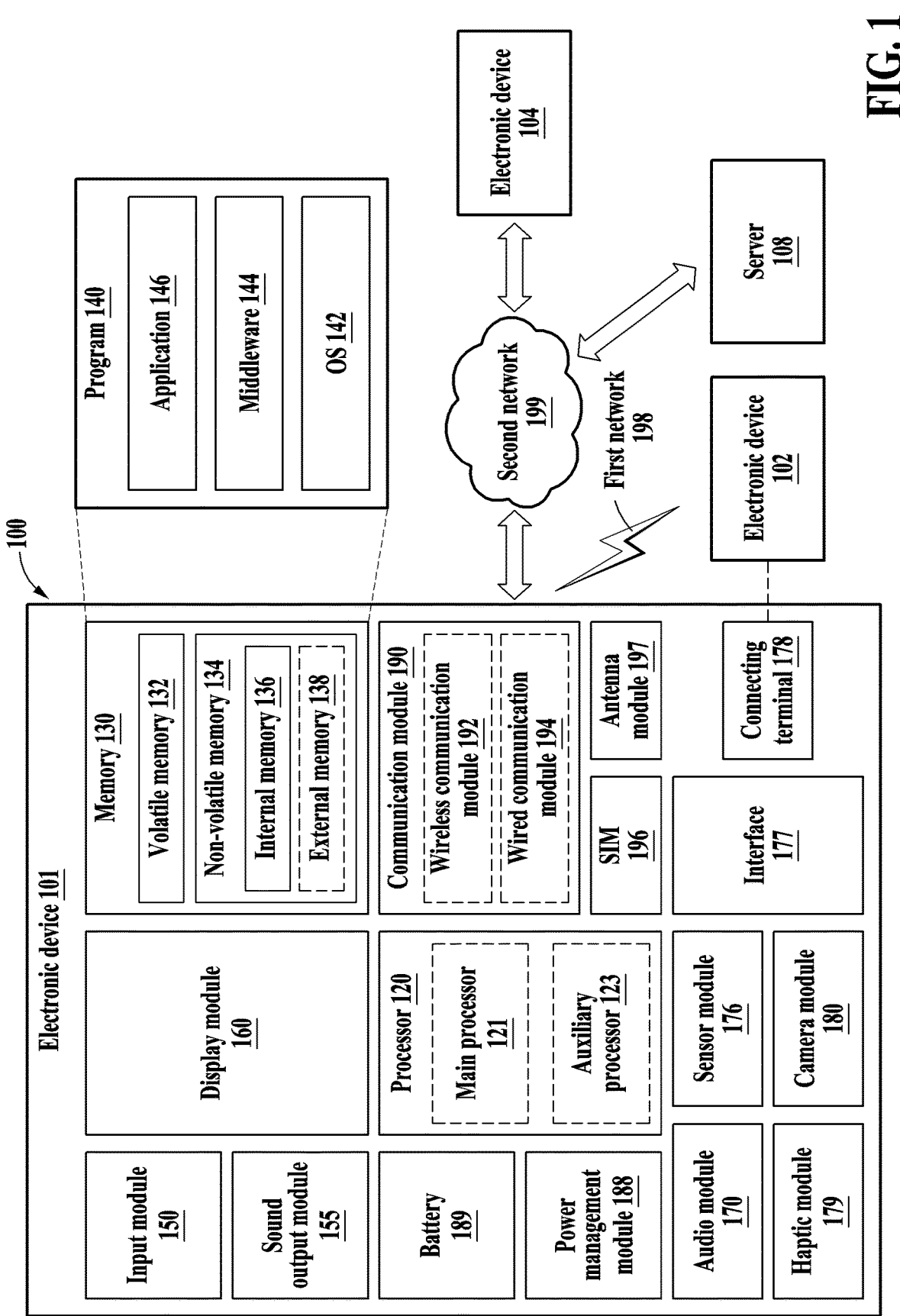
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one (e.g., the connecting terminal 178) of the above components may be omitted from the electronic device 101, or one or more other components may be added in the electronic device 101. In some embodiments of the disclosure, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment of the disclosure, as at least a portion of data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., a sleep) state or along with the main processor 121 while the main processor 121 is in an active state (e.g., executing an application). According to an embodiment of the disclosure, the auxiliary processor 123 (e.g., an ISP or a CP) may be implemented as a portion of another component (e.g., the camera module 180 or the communication module 190) that is functionally related to the auxiliary processor 123. According to an embodiment of the disclosure, the auxiliary processor 123 (e.g., an NPU) may include a hardware structure specified for artificial intelligence (AI) model processing. The AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment of the disclosure, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, or the projector. According to an embodiment of the disclosure, the display module 160 may include a touch sensor adapted to detect a touch, or a pressure sensor adapted to measure an intensity of a force incurred by the touch.

The audio module 170 may convert a sound into an electric signal or vice versa. According to an embodiment of the disclosure, the audio module 170 may obtain the sound via the input module 150 or output the sound via the sound output module 155 or an external electronic device (e.g., the external electronic device 102, such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., by wire) or wirelessly. According to an embodiment of the disclosure, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment of the disclosure, the haptic module 179 may include, for example, a motor, a piezoelectric element, or an electric stimulator.

The camera module 180 may capture a still image and moving images. According to an embodiment of the disclosure, the camera module 180 may include one or more lenses, image sensors, ISPs, or flashes.

The power management module 188 may manage power supplied to the electronic device 101. According to an embodiment of the disclosure, the power management module 188 may be implemented as, for example, at least a part of a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local region network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., a LAN or a wide region network (WAN)). These various types of communication modules may be implemented as a single component (e.g., a single chip), or may be implemented as multi components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth generation (4G) network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter wave (mmWave) band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment of the disclosure, another component (e.g., a radio frequency integrated circuit (RFIC)) other than the radiating element may be additionally formed as a portion of the antenna module 197.

According to an embodiment of the disclosure, the antenna module 197 may form a mmWave antenna module. According to an embodiment of the disclosure, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment of the disclosure, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least a portion of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In an embodiment of the disclosure, the external electronic device 104 may include an Internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2A:
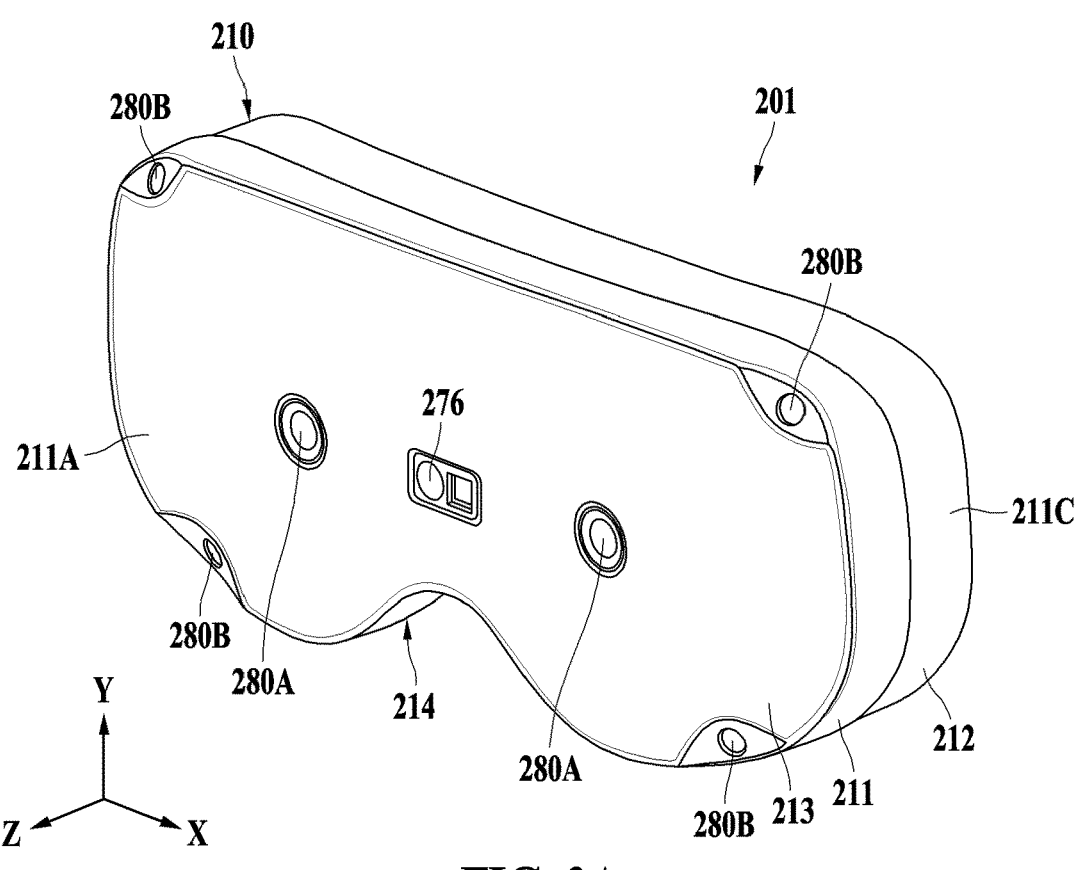
FIG. 2A is a front perspective view of a wearable electronic device according to an embodiment of the disclosure.

FIG. 2A is a front perspective view of a wearable electronic device according to an embodiment of the disclosure.

Figure 2B:
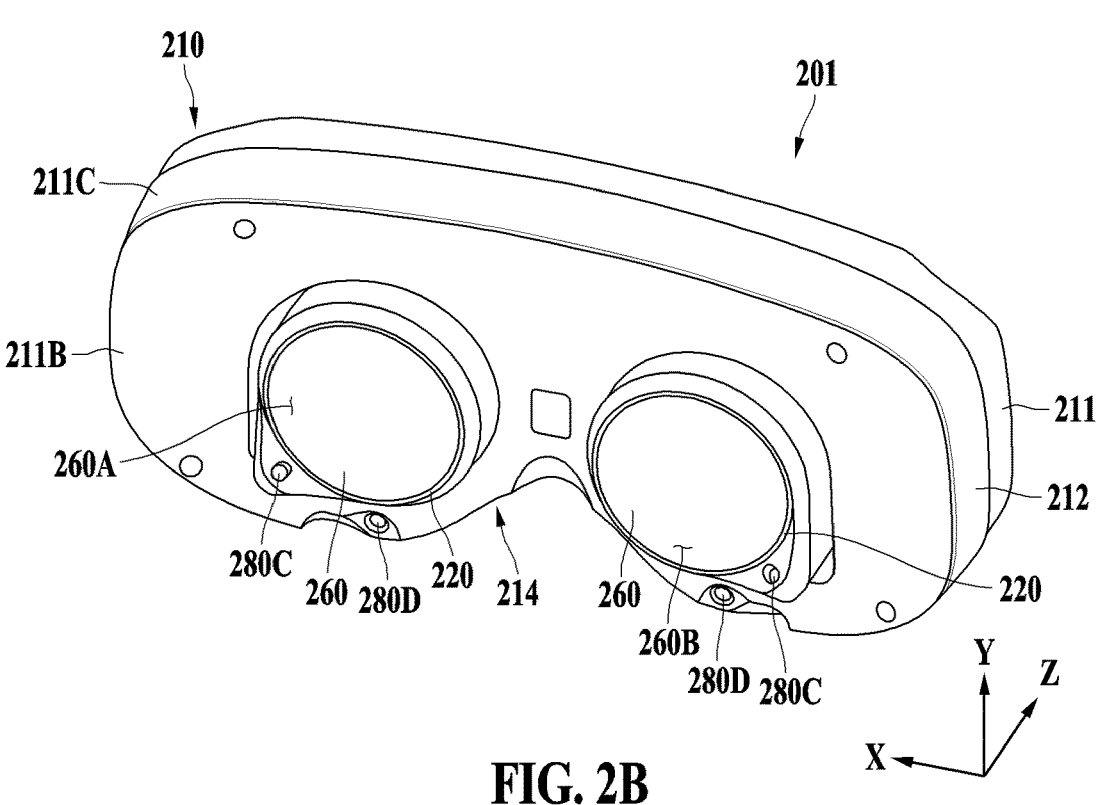
FIG. 2B is a rear perspective view of a wearable electronic device according to an embodiment of the disclosure.

FIG. 2B is a rear perspective view of a wearable electronic device according to an embodiment of the disclosure.

Referring to FIGS. 2A and 2B, a wearable electronic device 201 (e.g., the electronic device 101 of FIG. 1) may be worn on a part of the body of a user and may provide a user interface. For example, the wearable electronic device 201 may provide an experience of augmented reality, virtual reality, mixed reality, and/or extended reality to the user.

In an embodiment of the disclosure, the wearable electronic device 201 may include a housing 210. The housing 210 may be configured to accommodate at least one component. The housing 210 may include a first surface 211A (e.g., a front surface), a second surface 211B (e.g., a rear surface) opposite to the first surface 211A, and a third surface 211C (e.g., a side surface) between the first surface 211A and the second surface 211B.

In an embodiment of the disclosure, the housing 210 may include a plurality of housing parts. For example, the housing 210 may include a first housing part 211 and a second housing part 212. The first housing part 211 may form the first surface 211A of the housing 210. The first housing part 211 may form at least a portion of the third surface 211C of the housing 210. The second housing part 212 may form the second surface 211B of the housing 210. The second housing part 212 may form at least a portion of the third surface 211C of the housing 210. In an embodiment of the disclosure, the second housing part 212 may face a part (e.g., the face) of the user's body. In an embodiment of the disclosure, the first housing part 211 may be detachably coupled to the second housing part 212. In an embodiment of the disclosure, the first housing part 211 and the second housing part 212 may be seamlessly connected to each other as one.

In an embodiment of the disclosure, the housing 210 may include a cover 213. The cover 213 may form the first surface 211A of the housing 210. The cover 213 may be configured to cover at least a portion of the first housing part 211.

In an embodiment of the disclosure, the housing 210 may include a bridge 214. The bridge 214 may be configured to face a part (e.g., the nose) of the user's body. For example, the bridge 214 may be supported by the nose of the user. The bridge 214 may be formed as at least one or any combination of the first housing part 211, the second housing part 212, or the cover 213.

In an embodiment of the disclosure, the wearable electronic device 201 may include a lens structure 220. The lens structure 220 may include a plurality of lenses configured to adjust the focus of an image provided to the user. For example, the plurality of lenses may be configured to adjust the focus of an image output by a display 260. The plurality of lenses may be at a position corresponding to a position of the display 260. The plurality of lenses may include, for example, a Fresnel lens, a pancake lens, a multichannel lens, and/or other suitable lenses.

In an embodiment of the disclosure, the wearable electronic device 201 may include the display 260 (e.g., the display module 160 of FIG. 1). The display 260 may be configured to provide an image (e.g., a virtual image) to the user. In an embodiment of the disclosure, the display 260 may include a liquid crystal display (LCD), a digital mirror device (DMD), or a liquid crystal on silicon (LCoS), a light-emitting diode on silicon (LEDoS), an organic light-emitting diode (OLED), and/or a micro light-emitting diode (micro LED). In an embodiment of the disclosure, the display 260 may include a light source (not shown) configured to transmit an optical signal to an area where an image is output. In an embodiment of the disclosure, the display 260 may provide an image to the user by generating an optical signal by itself. In an embodiment of the disclosure, the display 260 may be disposed on the second surface 211B of the housing 210. In an embodiment of the disclosure, the display 260 may be disposed on the second housing part 212. In an embodiment of the disclosure, the display 260 may include a first display area 260A and a second display area 260B. The first display area 260A may be disposed to face the left eye of the user. The second display area 260B may be disposed to face the right eye of the user. In an embodiment of the disclosure, the first display area 260A and the second display area 260B may include glass, plastic, and/or polymer. In an embodiment of the disclosure, the first display area 260A and the second display area 260B may include a transparent material or a translucent material. In an embodiment of the disclosure, the first display area 260A and the second display area 260B may form a single display area. In an embodiment of the disclosure, the first display area 260A and the second display area 260B may form a plurality of display areas.

In an embodiment of the disclosure, the wearable electronic device 201 may include a sensor 276 (e.g., the sensor module 176 of FIG. 1). The sensor 276 may be configured to detect a depth of a subject. The sensor 276 may be configured to transmit a signal to the subject and/or receive a signal from the subject. For example, a transmission signal may include a near-infrared ray, an ultrasonic wave, and/or a laser. The sensor 276 may be configured to measure a time of flight (ToF) of a signal to measure a distance between the wearable electronic device 201 and the subject. In an embodiment of the disclosure, the sensor 276 may be disposed on the first surface 211A of the housing 210. In an embodiment of the disclosure, the sensor 276 may be disposed on a central portion of the cover 213 and/or the first housing part 211.

In an embodiment of the disclosure, the wearable electronic device 201 may include a plurality of first cameras 280A (e.g., the camera module 180 of FIG. 1). The plurality of first cameras 280A may be configured to obtain an image from the subject. One of the plurality of first cameras 280A may be disposed on a first area (e.g., a portion in a −X direction in FIG. 2A) of the first surface 211A of the housing 210, and another one of the plurality of first cameras 280A may be disposed on a second area (e.g., a portion in a +X direction in FIG. 2A) different from the first area of the first surface 211A of the housing 210. The plurality of first cameras 280A may be disposed on both sides of the sensor 276. The plurality of first cameras 280A may include an image stabilizer actuator (not shown) and/or an autofocus actuator (not shown). For example, the plurality of first cameras 280A may include at least one or any combination of a camera configured to obtain a color image, a global shutter camera, or a rolling shutter camera.

In an embodiment of the disclosure, the wearable electronic device 201 may include a plurality of second cameras 280B (e.g., the camera module 180 of FIG. 1). The plurality of second cameras 280B may be configured to recognize a subject. The plurality of second cameras 280B may be configured to detect and/or track a space or a 3-degrees of freedom (DoF) or 6-DoF object (e.g., the head or a hand of a human body). For example, the plurality of second cameras 280B may include a global shutter camera. The plurality of second cameras 280B may be configured to perform simultaneous localization and mapping (SLAM) using depth information of the subject. The plurality of second cameras 280B may be configured to recognize a gesture of the subject. In an embodiment of the disclosure, the plurality of second cameras 280B may be disposed on the first surface 211A of the housing 210. In an embodiment of the disclosure, the plurality of second cameras 280B may be respectively disposed on corner areas of the cover 213 and/or the first housing part 211.

In an embodiment of the disclosure, the wearable electronic device 201 may include a plurality of third cameras 280C (e.g., the camera module 180 of FIG. 1). The plurality of third cameras 280C may be configured to detect and track the pupils of the user. Position information on the pupils of the user may be used to move the center of an image displayed on the display 260 in a direction in which the pupils of the user gaze. For example, the plurality of third cameras 280C may include a global shutter camera. One of the plurality of third cameras 280C may be disposed to correspond to the left eye of the user and another one of the plurality of third cameras 280C may be disposed to correspond to the right eye of the user.

In an embodiment of the disclosure, the wearable electronic device 201 may include a plurality of fourth cameras 280D (e.g., the camera module 180 of FIG. 1). The plurality of fourth cameras 280D may be configured to recognize the face of the user. For example, the plurality of fourth cameras 280D may be configured to detect and track a facial expression of the user.

In an embodiment that is not illustrated, the wearable electronic device 201 may include a microphone (e.g., the input module 150 of FIG. 1), a speaker (e.g., the sound output module 155 of FIG. 1), a battery (e.g., the battery 189 of FIG. 1), an antenna (e.g., the antenna module 197 of FIG. 1), a sensor (e.g., the sensor module 176 of FIG. 1), and/or an arbitrary component that is suitable for the wearable electronic device 201.

Figure 3:
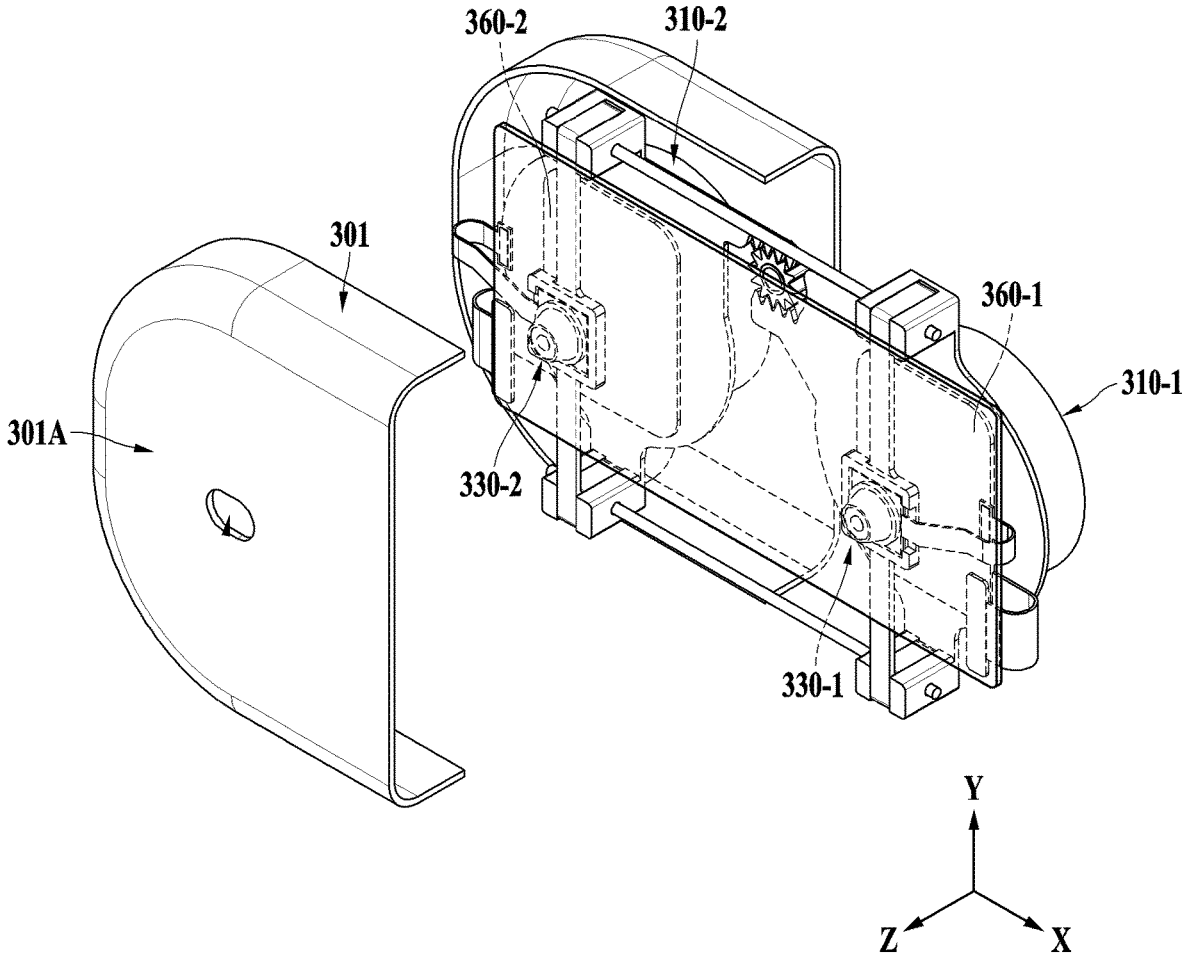
FIG. 3 is a perspective view of a wearable electronic device according to an embodiment of the disclosure.

FIG. 3 is a perspective view of a wearable electronic device according to an embodiment of the disclosure.

Referring to FIG. 3, a wearable electronic device (e.g., the electronic device 101 of FIG. 1 and/or the wearable electronic device 201 of FIGS. 2A and 2B) according to an embodiment may include a housing 301 (e.g., the housing 210 of FIGS. 2A and 2B).

The wearable electronic device may include a first lens assembly 310-1 corresponding to the left eye of a user and a second lens assembly 310-2 corresponding to the right eye of the user.

The wearable electronic device may include a first camera module 330-1 corresponding to the left eye of the user and a second camera module 330-2 corresponding to the right eye of the user. The first camera module 330-1 and the second camera module 330-2 may be configured to obtain an image from a subject. The first camera module 330-1 may be disposed in a first area (e.g., a portion in a +X direction in FIG. 3) of a first surface 301A of the housing 301, and the second camera module 330-2 may be disposed in a second area (e.g., a portion in a −X direction in FIG. 3) of the first surface 301A of the housing 301.

The wearable electronic device may include a first display module 360-1 configured to output an image ray toward the first lens assembly 310-1 and a second display module 360-2 configured to output an image ray toward the second lens assembly 310-2.

The wearable electronic device may include the first display module 360-1 corresponding to the left eye of the user and the second display module 360-2 corresponding to the right eye of the user. The display modules 360-1 and 360-2 may be configured to provide an image (e.g., a virtual image) to the user. The first display module 360-1 may be disposed to face the left eye of the user and the second display module 360-2 may be disposed to face the right eye of the user. The first display module 360-1 and the second display module 360-2 may include a transparent material or a translucent material.

The wearable electronic device may include a PCB (e.g., a printed board assembly (PBA), a flexible PCB (FPCB), or a rigid-flexible PCB (RFPCB)) disposed between the first camera module 330-1 and the first display module 360-1 and between the second camera module 330-2 and the second display module 360-2. The PCB may be connected to the first camera module 330-1 and the second camera module 330-2, and may be connected to the first display module 360-1 and the second display module 360-2.

According to an embodiment of the disclosure, the first display module 360-1 may provide a scene image in which a first type of image related to a real space obtained from the first camera module 330-1 and a second type of image related to a virtual space generated by a processor are overlapped, to the first lens assembly 310-1. The second display module 360-2 may provide a scene image in which a first type of image related to a real space obtained from the second camera module 330-2 and a second type of image related to a virtual space generated by a processor are overlapped, to the second lens assembly 310-2. The user may be provided with visual information related to a virtual space through the scene images provided based on the camera modules 330-1 and 330-2, the display panels 360-1 and 360-2, and the lens assemblies 310-1 and 310-2.

Figure 4:
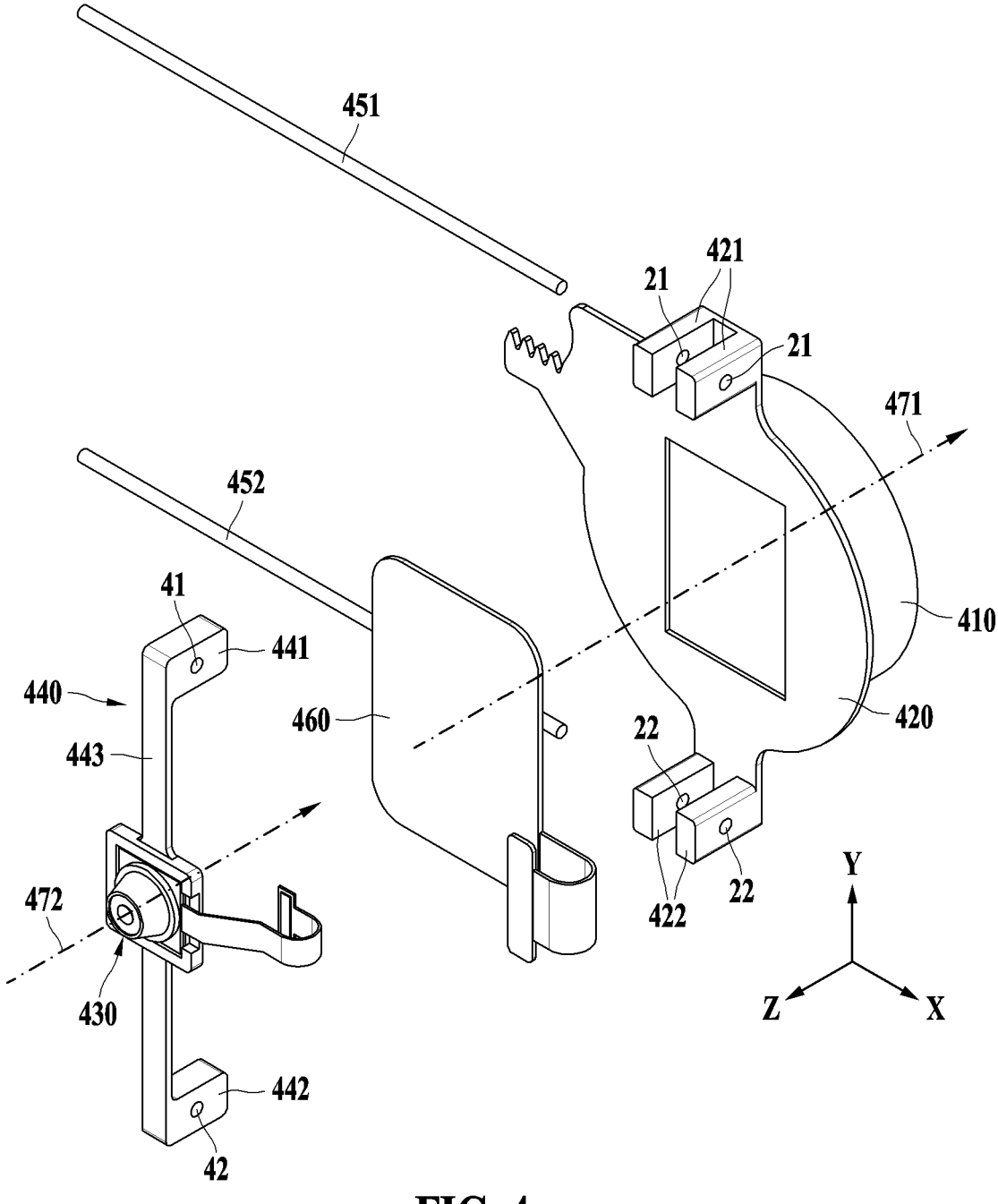
FIG. 4 is a diagram illustrating a coupling of a lens assembly, a display panel, and a camera module corresponding to one of a left eye and a right eye of a user, according to an embodiment of the disclosure.

FIG. 4 is a diagram illustrating a coupling of a lens assembly, a display panel, and a camera module corresponding to one of a left eye and a right eye of a user, according to an embodiment of the disclosure.

Referring to FIG. 4, according to an embodiment of the disclosure, a wearable electronic device (e.g., the electronic device 101 of FIG. 1 or the wearable electronic device 201 of FIGS. 2A and 2B) may include a lens assembly 410 including a first lens. The wearable electronic device may further include a first bracket 420 that secures the first lens of the lens assembly 410. The first bracket 420 may be connected to the lens assembly 410. The lens assembly 410 may include a plurality of lenses, but for convenience of description, the lens assembly 410 is described as including one lens. When the lens assembly 410 includes a plurality of lenses, the plurality of lenses may have substantially the same optical axis.

According to an embodiment of the disclosure, the wearable electronic device may include a second lens of a camera module 430, wherein the second lens has the same optical axis as an optical axis 471 of the first lens included in the lens assembly 410. For example, the lens assembly 410 may be connected to the camera module 430. The wearable electronic device may include a second bracket 440 supporting the camera module 430.

According to an embodiment of the disclosure, the lens assembly 410 and the camera module 430 may be configured to move together while the optical axis 471 of the first lens and an optical axis 472 of the second lens are aligned. The lens assembly 410 may be configured to move in a first direction (e.g., a +X direction) or a second direction (e.g., a –X direction) opposite to the first direction, and the camera module 430 may be configured to move in the first direction (e.g., the +X direction) or the second direction (e.g., the –X direction) opposite to the first direction. Given the coupling between the lens assembly 410 and the camera module 430, the lens assembly 410 and the camera module 430 may be configured to move in substantially the same direction, and the optical axis 471 of the first lens included in the lens assembly 410 and the optical axis 472 of the second lens of the camera module 430 may be aligned. Hereinafter, a method of coupling the lens assembly 410 and the camera module 430 is described.

According to an embodiment of the disclosure, the first bracket 420 may include a first surface facing the first lens and a second surface facing a direction (e.g., a +Z direction) opposite to the first surface. The first bracket 420 may include first coupling portions 421 and 422 formed on the second surface opposite to the first surface. For example, as shown in FIG. 4, the first bracket 420 may include the first coupling portion 421 formed on a first side (e.g., an upper side or a +Y direction side) on the second surface and the first coupling portion 422 formed on a second side (e.g., a lower side or a –Y direction side) on the second surface. The first side and the second side may be opposite sides based on the optical axis 471 of the first lens. The first coupling portion (e.g., the first coupling portion 421 or the first coupling portion 422) may include two fastening members that protrude by a predetermined height on the second surface in a direction (e.g., the +Z direction) substantially parallel to the optical axis 471 of the first lens. For example, the two fastening members may be spaced apart by a predetermined distance. As shown in FIG. 4, the first bracket 420 may include two coupling portions 421 and 422, but is not limited thereto, and the first bracket 420 may include one or three or more coupling portions.

According to an embodiment of the disclosure, the second bracket 440 supporting the camera module 430 may include an extension member 443 substantially perpendicular to the optical axis 472 of the second lens and a plurality of second coupling portions 441 and 442 formed at both ends of the extension member 443. For example, as shown in FIG. 4, the second bracket 440 may include the second coupling portion 441 formed on one end of the first side (e.g., the +Y direction side) of the extension member 443 and the second coupling portion 442 formed on the other end of the second side (e.g., the –Y direction side) of the extension member 443. Similarly, the first side and the second side may be opposite sides based on the optical axis 472 of the second lens. The second coupling portion (e.g., the second coupling portion 441 or the second coupling portion 442) may include a fastening member that protrudes by a predetermined height on one end and/or the other end of the extension member 443 in a direction (e.g., the –Z direction) substantially parallel to the optical axis 472 of the second lens.

According to an embodiment of the disclosure, by the coupling of the first bracket 420 that secures the first lens of the lens assembly 410 and the second bracket 440 that secures the camera module 430, the lens assembly 410 and the camera module 430 may be coupled. Referring to FIG.

4, the first coupling portion 421 included in the first bracket 420 may be coupled with the second coupling portion 441 included in the second bracket 440, and the first coupling portion 422 included in the first bracket 420 may be coupled with the second coupling portion 442 included in the second bracket 440. The fastening member included in the second coupling portion 441 may be disposed between the two fastening members included in the first coupling portion 421. The fastening member included in the second coupling portion 442 may be disposed between the two fastening members included in the first coupling portion 422.

According to an embodiment of the disclosure, the first coupling portion 421 included in the first bracket 420 may be coupled with the second coupling portion 441 included in the second bracket 440 using a first shaft 451. The first coupling portion 422 included in the first bracket 420 may be coupled with the second coupling portion 442 included in the second bracket 440 using a second shaft 452. The first coupling portion 421 formed on the first side (e.g., the +Y direction side) included in the first bracket 420 may have fastening holes 21 formed therein to be coupled with the second bracket 440. The fastening holes 21 may be formed in the fastening members of the first coupling portion 421. Similarly, fastening holes 22 may be formed in the first coupling portion 422 formed on the second side (e.g., the –Y direction side) included in the first bracket 420. A fastening hole 41 may be formed in the second coupling portion 441 formed on the first side of the extension member 443 included in the second bracket 440 to be coupled with the first bracket 420, and a fastening hole 42 may be formed in the second coupling portion 442 formed on the second side of the extension member 443. The first shaft 451 may be inserted in the fastening holes 21 formed in the first coupling portion 421 and the fastening hole 41 formed in the second coupling portion 441, and the second shaft 452 may be inserted in the fastening holes 22 formed in the first coupling portion 422 and the fastening hole 42 formed in the second coupling portion 442.

The first shaft 451 and the second shaft 452 may be substantially parallel to each other, and may be disposed to be spaced apart from each other. The first shaft 451 and the second shaft 452 may respectively extend along an axis (e.g., an X direction axis) that skews the optical axis 471 of the first lens and the optical axis 472 of the second lens.

According to an embodiment of the disclosure, the lens assembly 410 and the camera module 430 may be configured to be movable along the first shaft 451 and the second shaft 452. When the lens assembly 410 moves along an axis (e.g., the X direction axis) corresponding to the shaft (e.g., the first shaft 451 or the second shaft 452) by a predetermined distance, the camera module 430 coupled with the lens assembly 410 may move along the axis (e.g., the X direction axis) corresponding to the shaft (e.g., the first shaft 451 or the second shaft 452) as much as the distance that the lens assembly 410 moves.

According to an embodiment of the disclosure, the wearable electronic device may further include a display module 460 (e.g., the display module 360-1 or the display module 360-2 of FIG. 3) which is disposed between the lens assembly 410 and the camera module 430 to be secured to the lens assembly 410 and configured to output an image ray toward the lens assembly 410. A connecting member may be formed on a side of the display module 460. By the coupling between the connecting member formed on a side of the display module 460 and the first bracket 420, the display module 460 and the lens assembly 410 may be connected to each other.

According to an embodiment of the disclosure, the lens assembly 410 and the display module 460 may be coupled first when the wearable electronic device is manufactured. For example, the display module 460 configured to output an image ray toward the lens assembly 410 may be secured to the lens assembly 410 including the first lens. The optical axis of the first lens may be determined and corrected using active alignment technology. When the wearable electronic device is manufactured, after the lens assembly 410 and the display module 460 are coupled, the camera module 430 including the second lens having substantially the same optical axis as the optical axis of the first lens of the lens assembly 410 may be coupled with the lens assembly 410.

According to an embodiment of the disclosure, the wearable electronic device may further include a processor (e.g., the processor 120 of FIG. 1) configured to build a virtual space. The processor may build a virtual space by generating a virtual graphical representation or a virtual object. The display module 460 may overlap a first type of image related to a real space obtained from the camera module 430 and a second type of image related to a virtual space generated by the processor to provide to the lens assembly 410.

Figure 5:
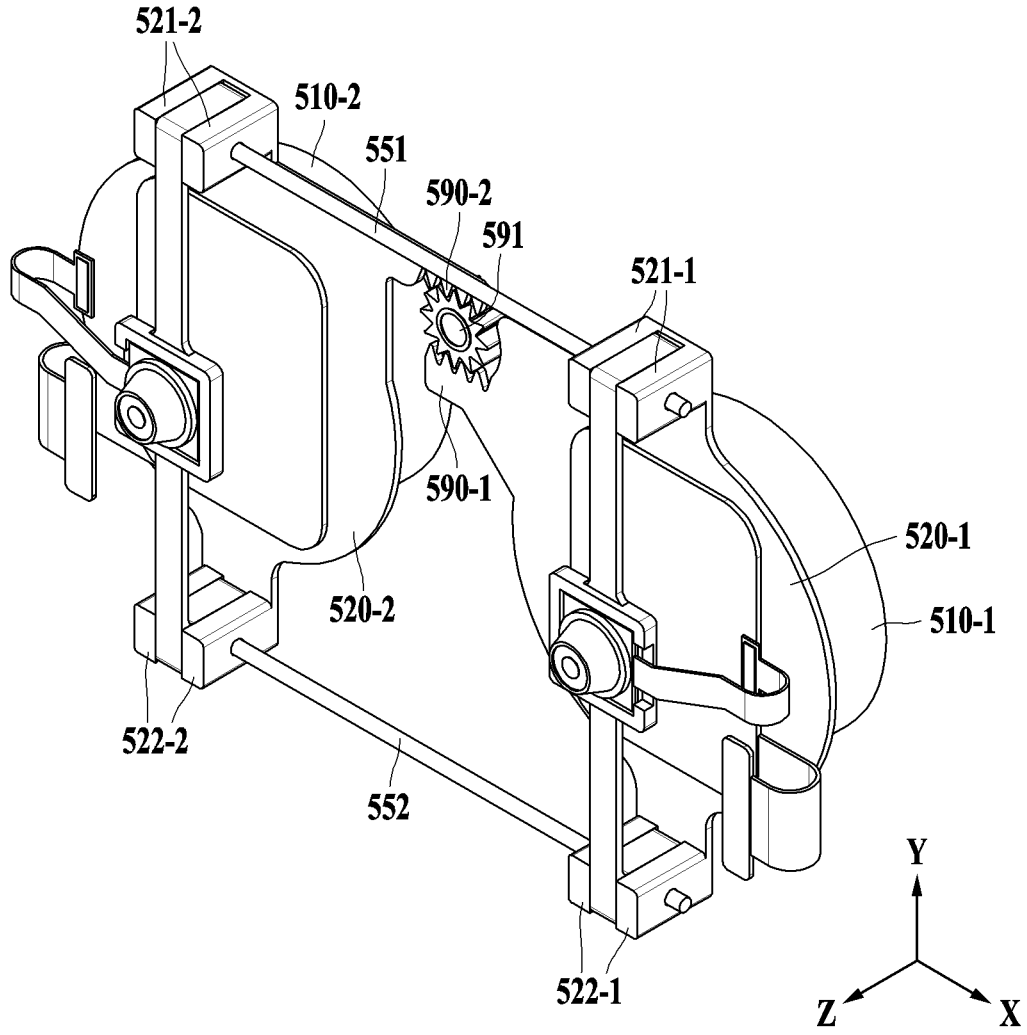
FIG. 5 is a diagram illustrating a coupling between lens assemblies of a wearable electronic device according to an embodiment of the disclosure.

FIG. 5 is a diagram illustrating a coupling between lens assemblies of a wearable electronic device according to an embodiment of the disclosure.

Referring to FIG. 5, a wearable electronic device (e.g., the electronic device 101 of FIG. 1 or the wearable electronic device 201 of FIGS. 2A and 2B) according to an embodiment may include a first lens assembly 510-1 corresponding to the left eye of a user and a second lens assembly 510-2 corresponding to the right eye of the user. The first lens assembly 510-1 and the second lens assembly 510-2 may be coupled through a shaft and may be configured to be movable along the shaft. The first lens assembly 510-1 and the second lens assembly 510-2 may be coupled using a first shaft 551 (e.g., the first shaft 451 of FIG. 4) and a second shaft 552 (e.g., the second shaft 452 of FIG. 4). The first lens assembly 510-1 and the second lens assembly 510-2 may be movable on substantially the same plane (e.g., an XY plane). Hereinafter, a method of coupling the first lens assembly 510-1 and the second lens assembly 510-2 is described.

The wearable electronic device may include a first bracket 520-1 coupled with a lens of the first lens assembly 510-1, and may further include a third bracket 520-2 coupled with a lens of the second lens assembly 510-2. The first bracket 520-1 may include coupling portions 521-1 and 522-1, and each of the coupling portions 521-1 and 522-1 may include two fastening members that protrude by a predetermined height in a direction (e.g., a +Z direction) substantially parallel to an optical axis of the lens of the first lens assembly 510-1. The third bracket 520-2 may include coupling portions 521-2 and 522-2, and each of the coupling portions 521-2 and 522-2 may include two fastening members that protrude by a predetermined height in a direction (e.g., the +Z direction) substantially parallel to an optical axis of the lens of the second lens assembly 510-2. Fastening holes may be formed in each of the coupling portions 521-1 and 522-1 included in the first bracket 520-1, and fastening holes may be formed in each of the coupling portions 521-2 and 522-2 included in the third bracket 520-2. The first shaft 551 (e.g., the first shaft 451 of FIG. 4) may be inserted into a fastening hole formed in the coupling portion 521-1 and a fastening hole formed in the coupling portion 521-2. The second shaft 552 (e.g., the second shaft 452 of FIG. 4) may be inserted into a fastening hole formed in the coupling portion 522-1 and a fastening hole formed in the coupling portion 522-2. The first shaft 551 and the second shaft 552 may be parallel to each other.

In an embodiment of the disclosure, the first bracket 520-1 may include a first gear 590-1. The first gear 590-1 may include a plurality of first teeth arranged in a first direction (e.g., a +X direction) or a second direction (e.g., a −X direction). The third bracket 520-2 may include a second gear 590-2. The second gear 590-2 may include a plurality of second teeth arranged in the first direction (e.g., the +X direction) or the second direction (e.g., the −X direction). The plurality of second teeth may face the plurality of first teeth.

In an embodiment of the disclosure, the wearable electronic device may include an adjustment structure 591. The adjustment structure 591 may be configured to adjust a distance between the first lens assembly 510-1 and the second lens assembly 510-2. The adjustment structure 591 may be configured to adjust a position of the lens of the first lens assembly 510-1 and/or a position of the lens of the second lens assembly 510-2 to suit the user's individual interpupillary distance (IPD). The adjustment structure 591 may include an adjustment gear, and the adjustment gear may be configured to engage with the first gear 590-1 and the second gear 590-2. In an embodiment of the disclosure, the adjustment gear may be configured to rotate.

Figure 6:
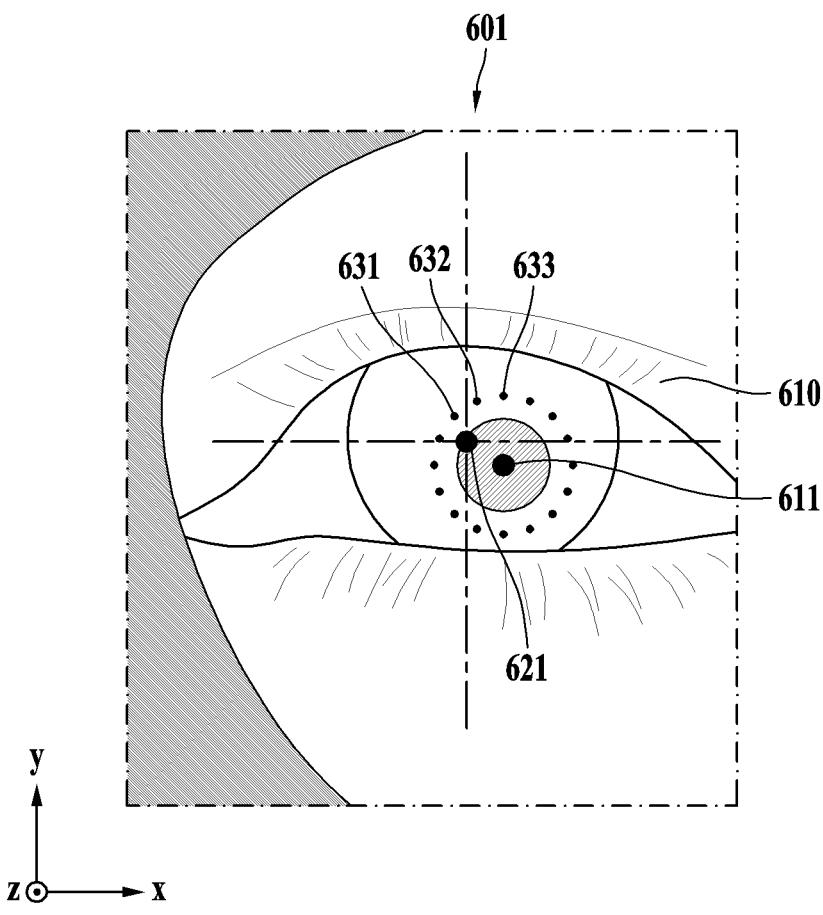
FIG. 6 is a diagram illustrating an operation in which a wearable electronic device corrects an image based on a distance between a pupil of a user and an optical axis of a lens, according to an embodiment of the disclosure.

FIG. 6 is a diagram illustrating an operation in which a wearable electronic device corrects an image based on a distance between a pupil of a user and an optical axis of a lens, according to an embodiment of the disclosure.

Referring to FIG. 6, in an embodiment of the disclosure, a range of a user's IPD available in a wearable electronic device (e.g., the electronic device 101 of FIG. 1 or the wearable electronic device 201 of FIGS. 2A and 2B) may be predetermined. According to an embodiment of the disclosure, the wearable electronic device may measure an IPD of the user. The wearable electronic device may correct an image output from a display module when a measured IPD of the user is less than a lower limit or exceeds an upper limit of an available IPD range of the wearable electronic device. More specifically, according to the IPD of the user, the wearable electronic device may correct a position at which a second type of image related to a virtual space is to be output from the display module, based on a first type of image related to a real space, thereby minimizing a cognitive gap between the real space expected by the user and the image output from the display module.

According to an embodiment of the disclosure, the wearable electronic device (e.g., the electronic device 101 of FIG. 1 or the wearable electronic device 201 of FIGS. 2A and 2B) may correct an image to be output from the display module (e.g., the display module 460 of FIG. 4) by comparing a position of the user's pupil with an optical axis of a lens (e.g., a lens of a lens assembly or a lens of a camera module). Hereinafter, the wearable electronic device correcting an image to be output from the display module that corresponds to the left pupil of the user is mainly described.

According to an embodiment of the disclosure, the wearable electronic device may include a first lens assembly (e.g., the lens assembly 410 of FIG. 4) corresponding to a left eye 610 of the user and a first camera module (e.g., the camera module 430 of FIG. 4) corresponding to the left eye 610 of the user. The first lens assembly may include a first lens and the first camera module may include a second lens, and the wearable electronic device may be configured such that an optical axis (e.g., the optical axis 471 of the first lens of FIG. 4) of the first lens and an optical axis (e.g., the optical axis 472 of the second lens of FIG. 4) of the second lens are aligned. The first camera module may be coupled with the first lens assembly. The first lens assembly and the first camera module may be configured to move together while the optical axis of the first lens and the optical axis of the second lens are aligned. The wearable electronic device may further include a first display module (e.g., the display module 460 of FIG. 4) disposed between the first lens assembly and the first camera module, and configured to output an image ray toward the first lens assembly.

According to an embodiment of the disclosure, the wearable electronic device may further include cameras (e.g., the plurality of third cameras 280C of FIGS. 2A and 2B) configured to capture the pupils (e.g., the left pupil and the right pupil) of the user. The wearable electronic device may determine whether the user's pupil is aligned with an optical axis of a lens included in the lens assembly from an image capturing the user's pupil.

Referring to FIG. 6, the wearable electronic device may determine whether the user's left pupil is aligned with the optical axis of the first lens included in the first lens assembly from an image 601 capturing the left eye 610 of the user. The wearable electronic device may detect the center of the user's left pupil from the image 601. For example, the wearable electronic device may identify the user's left pupil and cause an infrared (IR) light source (e.g., an IR LED) to emit light around the user's left pupil that is identified. The wearable electronic device may detect a point 611 corresponding to the center of the user's left pupil using points 631, 632, and 633 displayed on the image 601 by the light emitted from the IR light source. In addition, the wearable electronic device may detect a point 621 corresponding to the optical axis of the first lens included in the first lens assembly from the image 601.

According to an embodiment of the disclosure, the wearable electronic device may determine whether the left pupil is aligned with the optical axis of the first lens based on a first axis (e.g., a +X direction axis). For example, the wearable electronic device may compare first axis coordinates of a point 611 corresponding to the center of the left pupil with first axis coordinates of the point 621 corresponding to the optical axis of the first lens. The wearable electronic device may determine whether the first axis coordinates of the point 611 corresponding to the center of the left pupil and the first axis coordinates of the point 621 corresponding to the optical axis of the first lens are substantially the same. The wearable electronic device may determine that the left pupil is aligned with the optical axis of the first lens, when the first axis coordinates of the point 611 corresponding to the center of the left pupil are substantially the same as the first axis coordinates of the point 621 corresponding to the optical axis of the first lens. The wearable electronic device may determine that the left pupil is not aligned with the optical axis of the first lens, when the first axis coordinates of the point 611 corresponding to the center of the left pupil and the first axis coordinates of the point 621 corresponding to the optical axis of the first lens are different.

According to an embodiment of the disclosure, when it is determined that the left pupil is aligned with the optical axis of the first lens, the wearable electronic device may not correct an image to be output from the first display module. For example, the wearable electronic device may not change the position at which the second type of image related to a virtual space generated by the processor is to be output from the first display module. For example, the first type of image related to a real space obtained from the first camera module may have a fixed position at which the first type of image is to be output from the first display module.

According to an embodiment of the disclosure, when it is determined that the left pupil is not aligned with the optical axis of the first lens, the wearable electronic device may change the position at which the second type of image related to the virtual space generated by the processor is to be output from the first display module. For example, the wearable electronic device may shift the second type of image in a first direction (e.g., a +X direction) or a second direction (e.g., a −X direction) with respect to the first type of image whose position to be output from the first display module is fixed. The wearable electronic device may output a scene image generated by overlapping the first type of image and the shifted second type of image to the first display module.

According to an embodiment of the disclosure, the wearable electronic device may determine a direction in which the second type of image is to be shifted by comparing a position of a point corresponding to the user's pupil with a position of a point corresponding to an optical axis of a lens included in the lens assembly. According to an embodiment of the disclosure, the wearable electronic device may shift the second type of image in the first direction (e.g., the +X direction) relative to the first type of image, when the point corresponding to the user's pupil is positioned at a first side (e.g., a +X direction side) compared to the point corresponding to the optical axis of the lens. According to an embodiment of the disclosure, the wearable electronic device may shift the second type of image in the second direction (e.g., the −X direction) relative to the first type of image, when the point corresponding to the user's pupil is positioned at a second side (e.g., a −X direction side) compared to the point corresponding to the optical axis of the lens. Referring to FIG. 6, the wearable electronic device may shift the second type of image in the first direction (e.g., the +X direction) relative to the first type of image, when the point 611 corresponding to the center of the left pupil is positioned at the first side (e.g., the +X direction side) compared to the point 621 corresponding to the optical axis of the first lens. The wearable electronic device may shift the second type of image in the second direction (e.g., the −X direction) relative to the first type of image, when the point 611 corresponding to the center of the left pupil is positioned at the second side (e.g., the −X direction side) compared to the point 621 corresponding to the optical axis of the first lens.

Figure 7:
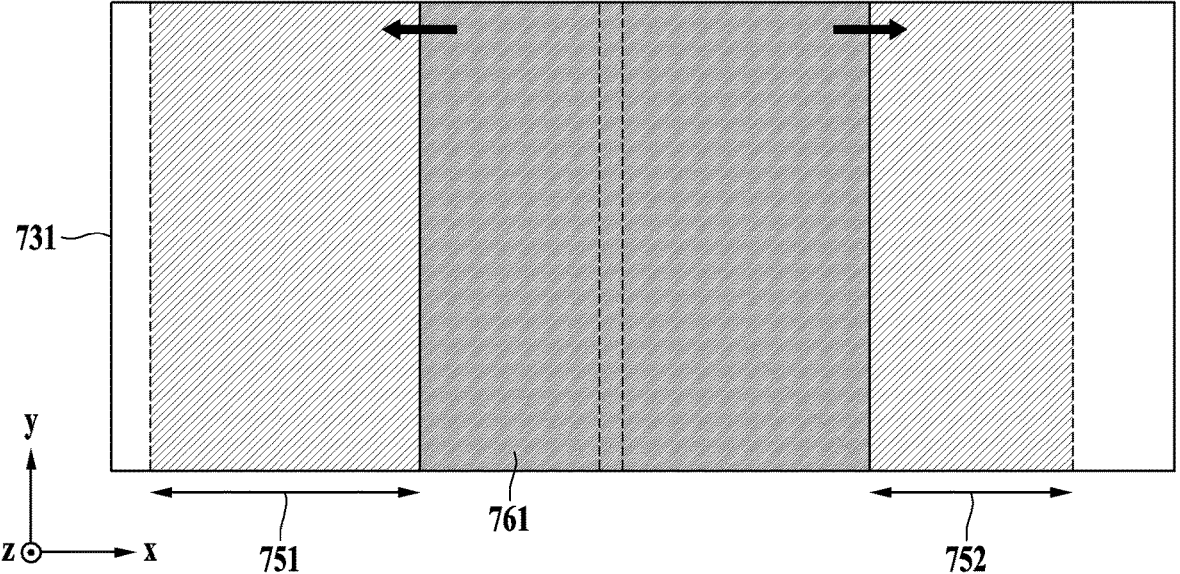
FIG. 7 is a diagram illustrating an operation of shifting a second type of image generated by a processor based on a first type of image according to an embodiment of the disclosure.

FIG. 7 is a diagram illustrating an operation of shifting a second type of image generated by a processor based on a first type of image according to an embodiment of the disclosure.

Referring to FIG. 7, according to an embodiment of the disclosure, a first type of image 731 obtained from a first camera module (e.g., the camera module 430 of FIG. 4) and a second type of image 761 generated by a processor may be overlapped and output from a display module (e.g., the display module 460 of FIG. 4). As described above, an area in which the first type of image 731 is output from the first display module may be fixed, and an area in which the second type of image 761 is output may be varied. The area in which the first type of image 731 is output from the first display module may include the area in which the second type of image 761 is output. For example, referring to FIG. 7, a height of the area in which the first type of image 731 is output may be substantially the same as a height of the area in which the second type of image 761 is output, and a width of the area in which the first type of image 731 is output may be wider than a width of the area in which the second type of image 761 is output.

According to an embodiment of the disclosure, the wearable electronic device may calculate an error distance between a point corresponding to a pupil of a user and a point corresponding to an optical axis of a first lens based on a first axis, and shift the second type of image relative to the first type of image by a distance proportional to the calculated error distance. Referring to FIG. 7, the wearable electronic device may position the first type of image 731 such that the center of the first type of image 731 and the center of the second type of image 761 are aligned when it is determined that the left pupil is aligned with the optical axis of the first lens included in the first lens assembly. When it is determined that the left pupil is not aligned with the optical axis of the first lens, the wearable electronic device may calculate an error distance between a point (e.g., the point 611 of FIG. 6) corresponding to the center of the left pupil and a point (e.g., the point 621 of FIG. 6) corresponding to the optical axis of the first lens based on the first axis (e.g., a +X direction axis). For example, the wearable electronic device may calculate a difference between first axis (e.g., the +X direction axis) coordinates of the point corresponding to the center of the left pupil and first axis (e.g., the +X direction axis) coordinates of the point corresponding to the optical axis of the first lens as the error distance. The wearable electronic device may shift the second type of image 761 by a distance proportional to the calculated error distance. In the example of FIG. 7, the wearable electronic device may determine that the point corresponding to the center of the user's left pupil with respect to the first axis is positioned on a second side (e.g., a –X direction side) compared to the point corresponding to the optical axis of the first lens, and that the point corresponding to the center of the user's left pupil with respect to the first axis is separated by a first distance from the point corresponding to the optical axis of the first lens. In such a case, the wearable electronic device may shift the second type of image 761 in a second direction (e.g., a –X direction) by a distance 751 proportional to the first distance. In another example, the wearable electronic device may determine that the point corresponding to the center of the user's left pupil with respect to the first axis is positioned on a first side (e.g., a +X direction side) compared to the point corresponding to the optical axis of the first lens, and that the point corresponding to the center of the user's left pupil with respect to the first axis is separated by a second distance less than the first distance from the point corresponding to the optical axis of the first lens. In such a case, the wearable electronic device may shift the second type of image 761 in a first direction (e.g., a +X direction) by a distance 752 proportional to the second distance. In this example, the distance 752 may be less than the distance 751.

The wearable electronic device (e.g., the electronic device 101 of FIG. 1 and/or the wearable electronic device 201 of FIGS. 2A and 2B) according to an embodiment may include the lens assembly 410 including a first lens, and the camera module 430 including a second lens having the same optical axis as the optical axis 471 of the first lens, and coupled with the lens assembly 410, wherein the lens assembly 410 and the camera module 430 may be configured to move together while the optical axis 471 of the first lens and the optical axis 472 of the second lens are aligned.

According to an embodiment of the disclosure, the wearable electronic device (e.g., the electronic device 101 of FIG. 1 and/or the wearable electronic device 201 of FIGS. 2A and 2B) may further include the first bracket 420 configured to secure the first lens, and the second bracket 440 configured to support the camera module, wherein the lens assembly 410 and the camera module 430 may be coupled based on the first bracket 420 and the second bracket 440 being coupled.

According to an embodiment of the disclosure, the first bracket 420 may include the first coupling portions 421 and 422 formed on a second surface opposite to a first surface facing the first lens, and the second bracket 440 may include the extension member 443 perpendicular to the optical axis 472 of the second lens and the plurality of second coupling portions 441 and 442 formed at both ends of the extension member 443.

According to an embodiment of the disclosure, the first shaft 451 may be inserted in the fastening hole 21 formed in the first coupling portion 421 of a first side, and the fastening hole 41 formed in the second coupling portion 441 of the first side, and the second shaft 452 may be inserted in the fastening hole 22 formed in the first coupling portion 422 of a second side and the fastening hole 42 formed in the second coupling portion 442 of the second side.

According to an embodiment of the disclosure, the lens assembly 410 and the camera module 430 may be configured to be movable along the first shaft 451 and the second shaft 452.

According to an embodiment of the disclosure, the wearable electronic device (e.g., the electronic device 101 of FIG. 1 and/or the wearable electronic device 201 of FIGS. 2A and 2B) may further include the display module 460 which is disposed between the lens assembly 410 and the camera module 430 to be secured to the lens assembly 410 and configured to output an image ray toward the lens assembly 410.

According to an embodiment of the disclosure, the wearable electronic device (e.g., the electronic device 101 of FIG. 1 and/or the wearable electronic device 201 of FIGS. 2A and 2B) may further include a processor configured to build a virtual space, and the display module 460 may overlap a first type of image related to a real space obtained from the camera module 430 and a second type of image related to a virtual space generated by the processor to provide to the lens assembly 410.

According to an embodiment of the disclosure, the wearable electronic device (e.g., the electronic device 101 of FIG. 1 and/or the wearable electronic device 201 of FIGS. 2A and 2B) may further include another lens assembly including a third lens, and another camera module including a fourth lens having the same optical axis as an optical axis of the third lens, and coupled with the another lens assembly, wherein the lens assembly 410 and the another lens assembly may be coupled through a shaft and configured to be movable along the shaft.

A method of manufacturing the wearable electronic device (e.g., the electronic device 101 of FIG. 1 and/or the wearable electronic device 201 of FIGS. 2A and 2B) according to an embodiment may include securing the display module 460 to the lens assembly 410 including a first lens, wherein the display module 460 is configured to output an image ray toward the lens assembly 410, and coupling the camera module 430 including a second lens having the same optical axis as the optical axis 471 of the first lens with the lens assembly 410, wherein the lens assembly 410 and the camera module 430 may be configured to move together while the optical axis 471 of the first lens and the optical axis 472 of the second lens are aligned.

According to an embodiment of the disclosure, the coupling of the camera module 430 with the lens assembly 410 may include coupling the camera module 430 with the lens assembly 410, in response to the first bracket 420 configured to secure the first lens and the second bracket 440 configured to support the camera module 430 being coupled.

According to an embodiment of the disclosure, the first bracket 420 may include the first coupling portions 421 and 422 formed on a second surface opposite to a first surface facing the first lens, and the second bracket 440 may include the extension member 443 perpendicular to the optical axis 472 of the second lens and the plurality of second coupling portions 441 and 442 formed at both ends of the extension member 443.

According to an embodiment of the disclosure, the coupling of the camera module 430 with the lens assembly 410 may include inserting the first shaft 451 in the fastening hole 21 formed in the first coupling portion 421 of a first side, and the fastening hole 41 formed in the second coupling portion 441 of the first side, and inserting the second shaft 452 in the fastening hole 22 formed in the first coupling portion 422 of a second side and the fastening hole 42 formed in the second coupling portion 442 of the second side.

The wearable electronic device (e.g., the electronic device 101 of FIG. 1 and/or the wearable electronic device 201 of FIGS. 2A and 2B) according to an embodiment may include a processor configured to build a virtual space, the lens assembly 410 including a first lens, the camera module 430 including a second lens having the same optical axis as the optical axis 471 of the first lens, and coupled with the lens assembly 410, and the display module 460 disposed between the lens assembly 410 and the camera module 430, and configured to output an image ray toward the lens assembly 410, wherein the processor may be configured to determine whether a pupil of a user and the optical axis 471 of the first lens are aligned, in response to determining that the pupil of the user is not aligned with the optical axis 471 of the first lens, shift a second type of image related to a virtual space generated by the processor based on a first type of image related to a real space obtained from the camera module 430, and output the first type of image and the shifted second type of image to the display module 460.

According to an embodiment of the disclosure, the processor may be configured to determine whether first axis coordinates of a point corresponding to the center of the pupil of the user and first axis coordinates of a point corresponding to the optical axis of the first lens are the same.

According to an embodiment of the disclosure, the processor may be configured to shift the second type of image in a first direction relative to the first type of image, in response to the point corresponding to the pupil of the user being positioned at a first side compared to the point corresponding to the optical axis of the first lens, and shift the second type of image in a second direction opposite to the first direction relative to the first type of image, in response to the point corresponding to the pupil of the user being positioned at a second side opposite to the first side compared to the point corresponding to the optical axis of the first lens.

According to an embodiment of the disclosure, the processor may be configured to calculate an error distance between the point corresponding to the pupil of the user and the point corresponding to the optical axis of the first lens based on a first axis, and shift the second type of image relative to the first type of image by a distance proportional to the calculated error distance.

A method implemented by a processor according to an embodiment may include determining whether a pupil of a user and the optical axis 471 of the first lens included in the lens assembly 410 are aligned, in response to determining that the pupil of the user is not aligned with the optical axis 471 of the first lens, shifting a second type of image related to a virtual space generated by the processor based on a first type of image related to a real space obtained from the camera module 430 including a second lens having the same optical axis as the optical axis 471 of the first lens, and outputting the first type of image and the shifted second type of image to the display module 460, wherein the camera module 430 may be coupled with the lens assembly 410, and the display module 460 may be disposed between the lens assembly 410 and the camera module 430, and configured to output an image ray toward the lens assembly 410.

According to an embodiment of the disclosure, the determining of whether there is alignment may include determining whether first axis coordinates of a point corresponding to the center of the pupil of the user and first axis coordinates of a point corresponding to the optical axis of the first lens are the same.

According to an embodiment of the disclosure, the shifting may include shifting the second type of image in a first direction relative to the first type of image, in response to the point corresponding to the pupil of the user being positioned at a first side compared to the point corresponding to the optical axis of the first lens, and shifting the second type of image in a second direction opposite to the first direction relative to the first type of image, in response to the point corresponding to the pupil of the user being positioned at a second side opposite to the first side compared to the point corresponding to the optical axis of the first lens.

According to an embodiment of the disclosure, the shifting may include calculating an error distance between the point corresponding to the pupil of the user and the point corresponding to the optical axis of the first lens based on a first axis, and shifting the second type of image relative to the first type of image by a distance proportional to the calculated error distance.

The electronic device according to various embodiments of the disclosure may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related components. As used herein, "A or B," "at least one of A and B," "at least one of A or B," "A, B or C," "at least one of A, B and C," and "at least one of A, B, or C," may include any one of the items listed together in the corresponding one of the phrases, or all possible combinations thereof. Terms, such as "1st" and "2nd," or "first" and "second" may be used to simply distinguish a corresponding component from other components, and do not limit the components in other aspects (e.g., importance or order). It is to be understood that if a component (e.g., a first component) is referred to, with or without the term "operatively" or "communicatively," as "coupled with," "coupled to," "connected with," or "connected to" another component (e.g., a second component), the component may be coupled with the other component directly (e.g., by wire), wirelessly, or via a third component.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to embodiments of the disclosure, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable electronic device comprising:
a lens assembly comprising a first lens; and
a camera module comprising a second lens having same optical axis as an optical axis of the first lens, and coupled with the lens assembly,
a first bracket configured to secure the first lens, the first bracket having first coupling portions, and
a second bracket configured to support the camera module, the second bracket having a plurality of second coupling portions,
wherein the lens assembly and the camera module are configured to move together while the optical axis of the first lens and an optical axis of the second lens are aligned, and
wherein the lens assembly and the camera module are coupled in response to the first coupling portions of the first bracket and the second coupling portions of the second bracket being moveably coupled to at least one shaft.

2. The wearable electronic device of claim 1,
wherein the first coupling portions are formed on a second surface opposite to a first surface facing the first lens, and
wherein the second bracket comprises an extension member perpendicular to the optical axis of the second lens and the plurality of second coupling portions are formed at both ends of the extension member.

3. The wearable electronic device of claim 1, wherein a first shaft is inserted in a fastening hole formed in a first coupling portion of a first side and a fastening hole formed in a second coupling portion of the first side, and wherein a second shaft is inserted in a fastening hole formed in the first coupling portion of a second side and a fastening hole formed in the second coupling portion of the second side.

4. The wearable electronic device of claim 3, wherein, the lens assembly and the camera module are configured to be movable along the first shaft and the second shaft.

5. The wearable electronic device of claim 1, further comprising:

a display module disposed between the lens assembly and the camera module to be fixed to the lens assembly, and configured to output an image ray toward the lens assembly.

6. The wearable electronic device of claim 5, wherein the wearable electronic device further comprises one or more processors configured to build a virtual space, and wherein the display module is configured to overlap a first type of image related to a real space obtained from the camera module and a second type of image related to a virtual space generated by the one or more processors to provide to the lens assembly.

7. The wearable electronic device of claim 1, wherein the wearable electronic device further comprises:

another lens assembly comprising a third lens, and another camera module comprising a fourth lens having the same optical axis as an optical axis of the third lens, and coupled with the another lens assembly, and wherein the lens assembly and the another lens assembly are coupled through a shaft and are configured to be movable along the shaft.

8. The wearable electronic device of claim 1, wherein the wearable electronic device further comprises:

memory storing one or more computer programs;

a display module disposed between the lens assembly and the camera module, and configured to output an image ray toward the lens assembly; and one or more processors configured to build a virtual space and communicatively coupled to the lens assembly, the camera module, the memory, and the display module, and wherein the one or more computer programs include computer-executable instructions that, when executed by one or more processors individually or collectively, cause the wearable electronic device to:

determine whether a pupil of a user and the optical axis of the first lens are aligned, in response to determining that the pupil of the user is not aligned with the optical axis of the first lens, shift a second type of image related to a virtual space generated by the one or more processors based on a first type of image related to a real space obtained from the camera module, and output the first type of image and the shifted second type of image to the display module.

9. The wearable electronic device of claim 8, wherein the one or more computer programs further include computer-executable instructions that, when executed by the one or more processors individually or collectively, cause the wearable electronic device to:

determine whether first axis coordinates of a point corresponding to the center of the pupil of the user and first axis coordinates of a point corresponding to the optical axis of the first lens are the same.

10. The wearable electronic device of claim 8, wherein the one or more computer programs further include computer-executable instructions that, when executed by the one or more processors individually or collectively, cause the wearable electronic device to:

shift the second type of image in a first direction relative to the first type of image, in response to a point corresponding to the pupil of the user being positioned at a first side compared to the point corresponding to the optical axis of the first lens, and shift the second type of image in a second direction opposite to the first direction relative to the first type of image, in response to the point corresponding to the pupil of the user being positioned at a second side opposite to the first side compared to the point corresponding to the optical axis of the first lens.

11. The wearable electronic device of claim 8, wherein the one or more computer programs further include computer-executable instructions that, when executed by the one or more processors individually or collectively, cause the wearable electronic device to:

calculate an error distance between a point corresponding to the pupil of the user and the point corresponding to the optical axis of the first lens based on a first axis, and shift the second type of image relative to the first type of image by a distance proportional to the calculated error distance.

12. A method of manufacturing a wearable electronic device, the method comprising:

securing a display module to a lens assembly comprising a first lens, wherein the display module is configured to output an image ray toward the lens assembly; and coupling a camera module comprising a second lens having a same optical axis as an optical axis of the first lens with the lens assembly, wherein the lens assembly and the camera module are configured to move together while the optical axis of the first lens and an optical axis of the second lens are aligned, and wherein the coupling of the camera module with the lens assembly comprises:

coupling the camera module with the lens assembly, in response to a first bracket configured to secure the first lens and a second bracket configured to support the camera module being moveably coupled to at least one shaft via first coupling portions of the first bracket and a plurality of second coupling portions of the second bracket.

13. The method of claim 12, wherein the first coupling portions are formed on a second surface opposite to a first surface facing the first lens, and wherein the second bracket comprises an extension member perpendicular to the optical axis of the second lens and the plurality of second coupling portions are formed at both ends of the extension member.

14. The method of claim 12, wherein the coupling of the camera module with the lens assembly comprises:

inserting a first shaft in a fastening hole formed in a first coupling portion of a first side and a fastening hole formed in a second coupling portion of the first side; and inserting a second shaft in a fastening hole formed in the first coupling portion of a second side and a fastening hole formed in the second coupling portion of the second side.

15. A method implemented by one or more processors of a wearable device, the method comprising:

determining whether a pupil of a user and an optical axis of a first lens comprised in a lens assembly are aligned;

in response to determining that the pupil of the user is not aligned with the optical axis of the first lens, shifting a second type of image related to a virtual space generated by the one or more processors based on a first type of image related to a real space obtained from a camera module a second lens having a same optical axis as the optical axis of the first lens; and outputting the first type of image and the shifted second type of image to a display module, wherein the shifting of the second type of image is based on a measured individual interpupillary distance (IPD) of the user being outside of a predetermined range of mechanical adjustment of the wearable device, wherein, the camera module is coupled with the lens assembly, and wherein the display module is disposed between the lens assembly and the camera module, and configured to output an image ray toward the lens assembly.

16. The method of claim 15, further comprising:

determining whether first axis coordinates of a point corresponding to the center of the pupil of the user and first axis coordinates of a point corresponding to the optical axis of the first lens are the same.

17. The method of claim 15, further comprising:

shifting the second type of image in a first direction relative to the first type of image, in response to a point corresponding to the pupil of the user being positioned at a first side compared to the point corresponding to the optical axis of the first lens; and shifting the second type of image in a second direction opposite to the first direction relative to the first type of image, in response to the point corresponding to the pupil of the user being positioned at a second side opposite to the first side compared to the point corresponding to the optical axis of the first lens.

18. The method of claim 15, further comprising:

calculating an error distance between a point corresponding to the pupil of the user and a point corresponding to the optical axis of the first lens based on a first axis; and shifting the second type of image relative to the first type of image by a distance proportional to the calculated error distance.

* * * * *